United States Patent Office 3,079,330
Patented Feb. 26, 1963

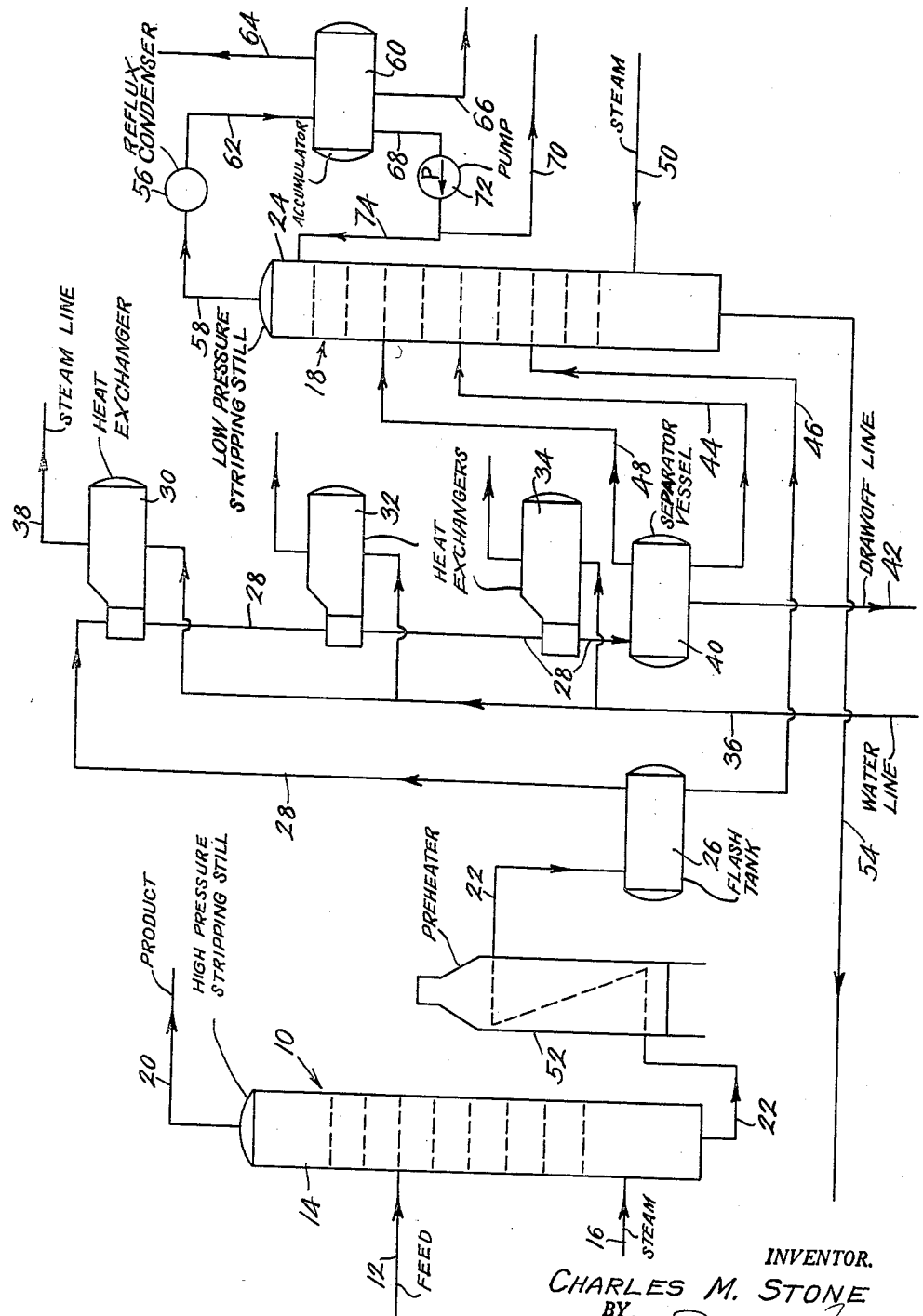

3,079,330
PROCESS FOR STEAM-STRIPPING HYDRO-
CARBON FRACTIONS FROM RICH OIL
Charles M. Stone, 9000 W. 7th Ave., Lakewood, Colo.
Filed July 5, 1960, Ser. No. 40,876
5 Claims. (Cl. 208—352)

This invention relates to processes for the recovery of absorbed hydrocarbon fractions from rich oil absorbent and, more specifically, to a process of the type described in which a substantial reduction in heat losses during the stage separation of the gaseous components is affected with a resultant decrease in overall processing costs.

In gasoline plants and the like where substantial quantities of butanes and propane from natural gas or hydrocarbon process vapors can be recovered economically, these gaseous fractions are customarily absorbed in oil and subsequently recovered therefrom in a stage separation system. Ordinarily, the lighter fractions are steam-stripped from the pre-heated rich oil at an elevated pressure of between approximately 150–250 p.s.i.a.; whereupon, the partially-stripped oil is again steam-stripped at the lowest practical pressure to remove the remaining absorbed components. The lean oil is then recycled through the absorbers while the stripped products are further processed as required.

Unfortunately, in the first or high pressure recovery state, additional steam over and above the steam needed for the stripping operation is required to satisfy the equilibrium of water soluble in the rich oil at the elevated temperatures and pressures. This dissolved steam, of course, gives up its latent heat of vaporization to the oil; however, the resultant increase in heat is of negligible practical effect when compared with the substantial investment required to generate the additional steam. Then, when the oil saturated with water is fed to the low pressure separation stage, the solubility of the water in the oil decreased substantially due to the drop in pressure resulting in vaporization of the excess water. The presence of this water vapor reduces the partial pressure of the system and increases the amounts of remaining hydrocarbon constituents and absorption oil that are vaporized. The net effect of this increase in the vaporized hydrocarbons and oil in the low pressure separation stage is to require that the capacities of the rectifying section and the condensing and reflux facilities be nearly doubled in order to condense these additional vaporized components resulting from the feed flash.

It has now been found, however, that the aforementioned heat losses can be substantially reduced through the introduction of a hot rich oil flash vessel between the high and low pressure separation stages in accordance with the teaching of the instant invention. With the introduction of this flash vessel into the system, the steam and hydrocarbon vapors remaining absorbed in the oil following removal of the lighter fractions in the relatively high pressure stage can be separated therefrom and exchanged with water to generate additional steam or with some other stream requiring heat. When this is done, nearly all of the absorbed water and a large percentage of the remaining absorbed hydrocarbon fractions can be separated from the oil and condensed ahead of the low pressure separation stage thus reducing the condensing requirements of the latter stage by this amount while recovering the latent heat of vaporization for use wherever additional heat is required.

It has also been found that the process is more efficient from the standpoint of heat requirements if the absorption oil is pre-heated between the high and low pressure separation stages rather than pre-heating the rich oil prior to entering the high pressure stage with no pre-heating between stages as is the custom in the prior art hydrocarbon recovery systems of this type. Actually, substantially lower pre-heating temperatures are required between stages than ahead of the first stage.

Accordingly, it is the principal object of the present invention to provide a novel and improved process for the separation and recovery of hydrocarbon fractions from an oil absorption medium.

A second objective is to provide a process of the type described wherein the overall heat requirements of the system are substantially reduced while more efficient use is made of the heat necessary for operation of the system.

Another object of the present invention is to introduce a step into the process between the high and low pressure separation stages wherein the water and a portion of the heavier hydrocarbon constituents remaining dissolved in the absorption medium are separated therefrom and utilized as a source of heat for the generation of stripping steam or some other heat requirements.

Still another object is to effect a reduction in the total heat requirements of an oil-absorption-type hydrocarbon recovery process through the use of a pre-heater for the partially degassified absorption oil between the primary and secondary separation stages.

A further objective of the instant invention is the provision of a gas separation and recovery process utilizing oil as an absorption medium that enables the second stage of a two stage unit to be designed with rectifying, condensing and refluxing facilities having a considerably reduced capacity.

Additional objects are to provide an improved process for the separation of propane and butanes from an oil absorbent that is efficient, economical, versatile, compatible for use with existing installations, and one that is adaptable to the separation and recovery of varying hydrocarbon fraction concentrations.

Other objects will be in part apparent and in part pointed out specifically hereinafter in connection with the description of the drawing which will be seen to disclose in diagrammatic form that portion of a gasoline plant or the like devoted to the separation and recovery of hydrocarbon constituents absorbed within an oil extraction medium through the use of a two-stage steam stripping process characterized by the inclusion of a rich oil flash vessel interposed between the separation stages along with a preheater, and one or more heat exchangers for the recovery of the latent heat of vaporization from the vaporized constituents liberated in the flash vessel.

Referring now to the drawing for a detailed description of the invention, it will be seen that the hydrocarbon fractions to be separated and recovered in the system are delivered to the primary or high pressure stage thereof, which has been indicated in a general way by numeral 10, following extraction in an oil absorption medium by means of feed line 12. Ordinarily, these hydrocarbon components comprise mainly propane and butanes in varying relative concentrations that have been extracted by the oil absorbent in a previous section of the plant from natural gas or hydrocarbon process vapors. The rich oil in feed line 12 connects into a steam distillation or stripping tower or still 14 at a point intermediate the upper and lower ends thereof where it is contacted by a stream of relatively high pressure steam line 16 located near the bottom. The first or primary separation stage is customarily operated at a pressure between approximately 150–250 p.s.i.a. which is relatively much higher than the second stage; hence, the primary stage will occasionally be referred to herein as the "high pressure stage" and the secondary stage, which has been designated broadly by reference numeral 18, as the "low pressure stage" for purposes of clearly differentiating therebetween.

The high pressure stripping step results in the separation of the lighter hydrocarbon components from the absorption medium and the removal of the former through product line 20 at the top of tower 14 where they are delivered to suitable condensing apparatus (not shown) or some other area of the plant for storage or immediate use in the vapor phase. As already mentioned, considerable additional steam is required in the high pressure stage over and above that needed to strip the lighter hydrocarbon fractions from the absorption oil in order to satisfy the equilibrium of the water soluble in the rich oil at the elevated pressures and temperatures of 400° F. or higher that are used in the still 14. The water thus absorbed along with the remaining unseparated hydrocarbon fractions are, therefore, drawn off in liquid form from the bottom of tower 14 through line 22 following desorption of the lighter hydrocarbon fractions. Ordinarily, this partially degassified liquid mixture would be fed directly to the low pressure steam still 24 of the second desorption stage 18 in accordance with the prior art teaching resulting in substantial heat losses and the necessity for oversized condensing, refluxing and rectifying equipment in this stage to handle the increased condensation requirements brought about by the flash vaporization of the excess steam and absorption oil. The instant process, on the other hand, interposes a flash vessel or tank 26 between the primary and secondary desorption stages 10 and 18 for the purpose of separating the absorbed water and remaining hydrocarbon fractions from the absorption medium prior to the low pressure steam stripping operation.

The liquid mixture drawn off from the bottom of the high pressure steam stripping still 14 through line 22 enters flash tank 26 where substantially all of the remaining hydrocarbon fractions are vaporized along with the water required to satisfy the equilibrium in the rich oil in the high pressure stage and substantial quantities of the absorption medium itself. This mixture of hot vapors released in the flash tank is then fed through vapor line 28 connected into the top of the flash tank 26 to some process line requiring additional heat in a heat-exchange relationship thereto. For purposes of illustration, the hot vapors eminating from the flash tank have been shown directed through a series of three heat exchangers 30, 32 and 34 into which water is also delivered through water line 36 for the production of steam and the recovery of heat from said vapor mixture as it condenses. It is quite possible to satisfy the stripping steam requirements of the process in this manner thus eliminating the need for auxiliary steam generating facilities and still have enough process steam left over to accomplish the fractionation of the absorbed hydrocarbons into the desired end products. The process steam generated in the heat exchangers is, of course, delivered where needed through process steam lines 38.

Following passage of the hot flash vapor mixture through the last heat exchanger 34 of the series, most of the vapors will have condensed, thereupon, they may either be fed as side reflux directly into the low pressure steam stripping tower 24 of the secondary separation stage or delivered into a separator vessel 40 as shown in the drawing. If vessel 40 is used, the condensed steam can be separated from the condensed hydrocarbons, the liquid absorption oil and the constituents remaining in the vapor phase through drawoff line 42. The remaining liquid components consisting of nearly all of the absorption medium and a substantial percentage of remaining hydrocarbon fractions, are delivered as side reflux to the low pressure steam stripping still 24 through interconnecting liquid line 44. Also, the liquid mixture remaining in vessel 26 following flash vaporization of the liquid drawoff from the first stage still is fed into the low pressure still by means of line 46 as side reflux.

In the particular embodiment of the invention illustrated herein, the components of the mixture drawn from the last heat exchanger 34 that remain in the vapor phase, are delivered as side reflux to still 24 in line 48; however, it should be mentioned that this uncondensed portion of the mixture, which contains mostly the heavier hydrocarbon fractions along with a small quantity of vaporized absorption oil, can be refluxed in yet another column (not shown) for purposes of separating the oil from the hydrocarbons thus bypassing the second stage still altogether should it appear that the additional horsepower required to accomplish recompression of this remaining vapor in still 24 is appreciable.

In any event, the side reflux entering the low pressure still 24 through lines 44, 46 and perhaps 48, is stripped with low pressure steam entering the lower end of the column through line 50 at a pressure of approximately 40 p.s.i.a. and a temperature of about 500° F. provided a preheater 52, to be described shortly, is interposed between the primary and secondary desorption stages. The lean absorption oil is drawn off the bottom of the still 24 through line 54 and recycled to the hydrocarbon extraction section of the plant while the desorbed heavier hydrocarbon fractions are delivered to reflux condenser 56 through line 58 connected into the top of the column. The stripping steam is condensed out of the vaporized hydrocarbon fractions in condenser 56 after which both phases are delivered to reflux accumulator 60 through connecting line 62 and the vapor phase separated by product line 64 from the liquid phase. The condensed steam is drawn off from the bottom of the accumulator in line 66 while the unvaporized hydrocarbon fractions are taken from the accumulator in line 68 and a portion thereof drawn off at 70 while the remainder is recycled by means of pump 72 into the top of column 24 through line 74 in a manner well known in the art. Of course, the desorbed lighter hydrocarbon fraction and stripping steam drawn off in line 20 from the top of the primary stage still 14 are similarly treated to accomplish the desired separation thereof.

It has already been briefly mentioned that a preheater 52 is preferably inserted in liquid drawoff line 22 between the primary and secondary separation stages for the purpose of raising the temperature of the absorption medium and remaining unseparated hydrocarbon fractions preparatory to delivery thereof into the low pressure steam stripping still 24. Preheating the liquid drawoff from the high pressure still between stages possesses certain advantages in terms of conservation of heat when compared with the general practice of preheating the rich oil prior to introduction thereof into the first separation stage where higher temperatures are required; hence, while not absolutely necessary, in the preferred embodiment of the present invention the preheating of the absorption medium and components dissolved therein is performed between the separation stages and even prior to the entry thereof into the flash vessel 26.

By way of example of the several advantages derived from the use of the instant process when compared with that heretofore employed, the following calculations exemplify the significant improvements in heat recovery realized thereby:

|  | With Heat Recovery Exchange | Without Heat Recovery Exchange |
|---|---|---|
| High Pressure Stage: |  |  |
| Pressure, p.s.i.a. | 250 | 250 |
| Feed Temp., °F | 450 | 450 |
| Stripping Steam, #/hr | 34,866 | 34,866 |
| Dissolved Steam, #/hr | 54,252 | 44,252 |
| Total Steam, #/hr | 89,118 | 89,118 |
| Low Pressure State: |  |  |
| Pressure, p.s.i.a. | 40 | 40 |
| Feed Temp., °F | 526 | 526 |
| Stripping Steam, #/hr | 30,906 | 30,906 |
| Flashed Vapor @ 100 p.s.i.a. and 526° F.— |  |  |
| Hydrocarbon, #/hr | 220,061 | 220,061 |
| Steam, #/hr | 40,680 | 40,680 |
| Condensed Vapor @ 90 p.s.i.a. and 260° F.— |  |  |
| Hydrocarbon, #/hr | 205,359 | 0 |
| Water, #/hr | 37,278 | 0 |
| Uncondensed Vapor, #/hr | 18,104 | 260,741 |
| Heat Recovered, M B.t.u./hr | 96,500 | 0 |
| As 165 p.s.i.a. Steam, #/hr | 33,875 | 0 |
| As 55 p.s.i.a. Steam, #/hr | 35,115 | 0 |
| As 30 p.s.i.a. Steam, #/hr | 22,400 | 0 |
| Reflux Condenser Duty, M B.t.u./hr | 93,149 | 189,649 |

Summarizing the above, 96,500,000 b.t.u./hr. of useful heat were recovered as 96,390 lbs./hr. of steam at 165, 55 and 30 p.s.i.a. The low pressure stage still reflux condenser duty is about half of that required when the intermediate hot absorbent oil flash step is eliminated. Of course, the foregoing calculations are based on an installation of substantial size; however, proportionate savings are attainable from smaller plants.

Having thus described the several useful and novel features of the improved process for recovering absorbed hydrocarbon components from an oil absorption medium, it will be seen that the many worthwhile objectives for which it was developed have been achieved. Although but a single specific embodiment of the invention has been illustrated and described in connection with the accompanying drawing, I realize that certain changes and modifications therein may well occur to those skilled in the art within the broad teaching hereof; hence, it is my intention that the scope of protection afforded hereby shall be limited only insofar as said limitations are expressly set forth in the appended claims.

What is claimed is:

1. The process for separating two or more gaseous hydrocarbon fractions from a liquid oil absorbent which comprises the steps of, stripping the rich oil with an excess of steam in a first stripping zone maintained at a pressure of between approximately 150–250 p.s.i.a. and a temperature of not less than approximately 400° F. to remove the lighter hydrocarbon fractions, separating and recovering the desorbed hydrocarbon fractions and unabsorbed stripping steam from the liquid mixture containing the absorption oil, absorbed steam and remaining hydrocarbon fractions, introducing the liquid mixture into and flashing the liquid mixture in a flash zone maintained at a substantially reduced pressure to vaporize the dissolved stripping stream and remaining hydrocarbon fractions, separating the vaporizing components of the mixture from the liquid components thereof, introducing the separated vaporized components from the flash zone into a condensing zone, cooling same and recovering the latent heat of vaporization thereof, stripping the unvaporized components of the mixture together with the uncondensed vaporized components and the condensed vaporized components thereof with steam in a second stripping zone maintained at a nominal pressure above atmospheric and a temperature not less than aproximately 500° F. to remove the remaining hydrocarbon fractions, and separating and recovering the remaining desorbed hydrocarbon fractions and any unabsorbed stripping steam from the liquid absorption medium.

2. The process for separating dissolved gaseous hydrocarbon fractions from a liquid oil absorbent as set forth in claim 1 which includes the step of preheating the liquid mixture to a temperature not less than approximately 500° F. between the steam stripping steps.

3. The process for separating dissolved gaseous hydrocarbon fractions from a liquid oil absorbent as set forth in claim 1 which includes the step of preheating the liquid mixture to a temperature not less than approximately 500° F. following the high-pressure steam stripping step and before said mixture is flashed to desorb the vaporizable components and subsequently recovering the latent heat of vaporization therefrom.

4. The process for separating dissolved gaseous hydrocarbon fractions from a liquid oil absorbent as set forth in claim 2 in which the liquid mixture is preheated to a temperature of approximately 525° F.

5. The process for separating dissolved gaseous hydrocarbon fractions from a liquid oil absorbent as set forth in claim 3 in which the liquid mixture is preheated to a temperature of approximately 525° F.

References Cited in the file of this patent

UNITED STATES PATENTS

| 2,183,604 | Barton et al. | Dec. 19, 1939 |
| 2,523,747 | Weatherby | Sept. 26, 1950 |
| 2,754,246 | Brosamer | July 10, 1956 |
| 2,782,141 | King | Feb. 19, 1957 |

OTHER REFERENCES

"Petroleum Refiner," vol. 28, No. 9, September 1949, pp. 213, 216, 217 and 220.